(12) United States Patent
Takayama

(10) Patent No.: US 11,570,320 B2
(45) Date of Patent: Jan. 31, 2023

(54) PRINTING METHOD, INFORMATION PROCESSING SYSTEM, AND NON-TRANSITORY COMPUTER-READABLE STORAGE MEDIUM STORING CONTROL PROGRAM

(71) Applicant: SEIKO EPSON CORPORATION, Tokyo (JP)

(72) Inventor: Takaharu Takayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/476,537

(22) Filed: Sep. 16, 2021

(65) Prior Publication Data

US 2022/0094801 A1 Mar. 24, 2022

(30) Foreign Application Priority Data

Sep. 18, 2020 (JP) .............................. JP2020-156878

(51) Int. Cl.
*H04N 1/00* (2006.01)
*G06F 3/12* (2006.01)

(52) U.S. Cl.
CPC ....... *H04N 1/00506* (2013.01); *G06F 3/1205* (2013.01); *G06F 3/1256* (2013.01); *G06F 3/1257* (2013.01)

(58) Field of Classification Search
CPC ...... G06F 3/121; G06F 3/1205; G06F 3/1207; G06F 3/1253; G06F 3/1284; G06F 3/1259
See application file for complete search history.

(56) References Cited

U.S. PATENT DOCUMENTS

| | | |
|---|---|---|
| 10,817,236 B2 | 10/2020 | Saeda et al. |
| 11,087,700 B1 | 8/2021 | Kumar et al. |
| 2006/0195794 A1 | 8/2006 | Sun et al. |
| 2008/0098021 A1 | 4/2008 | Harada et al. |
| 2009/0199275 A1 | 8/2009 | Brock et al. |
| 2012/0140251 A1* | 6/2012 | Grodsky ............ H04N 1/32144 358/1.9 |
| 2016/0105644 A1* | 4/2016 | Smith .................. G08B 29/185 348/159 |
| 2017/0078525 A1 | 3/2017 | Kubota |
| 2017/0085731 A1 | 3/2017 | Akuzawa |
| 2017/0118373 A1 | 4/2017 | Morita |
| 2019/0310809 A1 | 10/2019 | Sekine |
| 2019/0354324 A1 | 11/2019 | Kakitsuba |
| 2020/0349048 A1 | 11/2020 | Ito |
| 2022/0009241 A1* | 1/2022 | Azechi ..................... H04N 1/00 |
| 2022/0027098 A1 | 1/2022 | Miyata |
| 2022/0094802 A1 | 3/2022 | Takayama |

FOREIGN PATENT DOCUMENTS

JP 2019-202441 A 11/2019

* cited by examiner

*Primary Examiner* — Iriana Cruz
(74) *Attorney, Agent, or Firm* — Global IP Counselors, LLP

(57) ABSTRACT

A printing method includes a customizing step of receiving a customization instruction of an administrator and customizing a printing screen, a printing step of performing printing in response to reception of a printing start instruction, and a displaying step of displaying the customized printing screen during the printing step, in which in the customizing step, required information is prohibited from being deleted from a display, and optional information is permitted to be deleted from the display.

5 Claims, 8 Drawing Sheets

FIG. 3

[WAITING TIME EFFECTIVE UTILIZING SETTING/
CONTENT SETTING]

CUSTOMIZED IMAGE 1
C:\XXXX.png    SELECT

CUSTOMIZED IMAGE 2
C:\XXXX.png    SELECT

CUSTOMIZED CHARACTER STRING 1
★ BUSINESS CONTACT DETAILS
 1. ABOUT WORKING HOURS
XXXXXXXX

CUSTOMIZED CHARACTER STRING 2
★ TRAINING GUIDE
 1. IN-HOUSE TRAINING
XXXXXXXX

SAVE    CANCEL

FIG. 6

| | CUSTOMIZED IMAGE 1 | CUSTOMIZED IMAGE 2 | CUSTOMIZED CHARACTER STRING 1 | CUSTOMIZED CHARACTER STRING 2 |
|---|---|---|---|---|
| USER A | UNCONFIRMED | UNCONFIRMED | UNCONFIRMED | CONFIRMED (NOT DISPLAYED FROM NEXT TIME) |
| USER B | UNCONFIRMED | UNCONFIRMED | UNCONFIRMED | UNCONFIRMED |

FIG. 8

```
PRINTING/DISPLAY ITEM SETTING

PRINTING PROGRESS STATUS : ● DISPLAY   ○ NON-DISPLAY

DISPLAY FORMAT : ● ENDING NUMBER/ALL NUMBER
                          ○ PROGRESS BAR

INFORMATION ON REMAINING : ○ ALWAYS DISPLAY
        AMOUNT OF INK     ● DISPLAY BELOW SPECIFIED AMOUNT

DISPLAY FORMAT : ● ICON
                          ○ ICON + DESCRIPTION
```

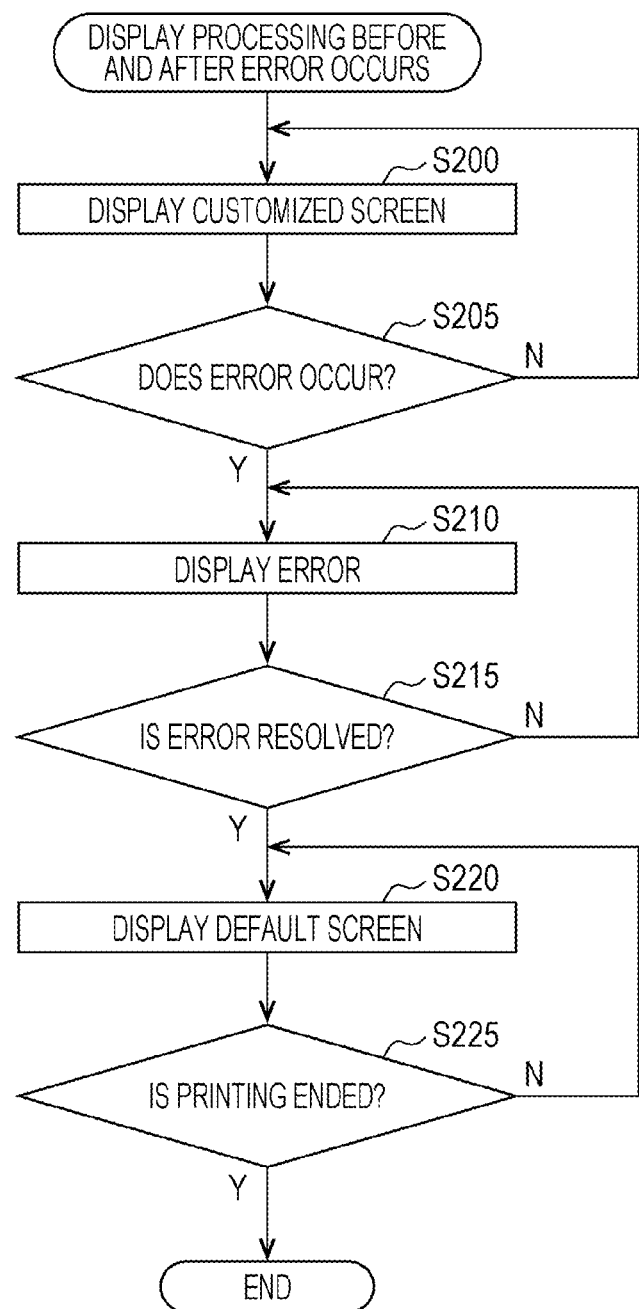

PRINTING METHOD, INFORMATION PROCESSING SYSTEM, AND NON-TRANSITORY COMPUTER-READABLE STORAGE MEDIUM STORING CONTROL PROGRAM

The present application is based on, and claims priority from JP Application Serial Number 2020-156878, filed Sep. 18, 2020, the disclosure of which is hereby incorporated by reference herein in its entirety.

BACKGROUND

1. Technical Field

The present disclosure relates to a printing method, an information processing system, and a non-transitory computer-readable storage medium storing a control program.

2. Related Art

In a multifunction device in the related art, it has been known to display the progress status of a job such as a print job (for example, JP-A-2019-202441, FIG. 10).

When various contents set by the administrator can be displayed in addition to the printing progress status during printing, the waiting time until the end of printing can be useful to the user.

SUMMARY

According to an aspect of the present disclosure, there is provided a printing method including a customizing step of receiving a customization instruction of an administrator and customizing a printing screen, a printing step of performing printing in response to reception of a printing start instruction, and a displaying step of displaying the customized printing screen during the printing step, in which in the customizing step, required information including information on a remaining amount of consumables is prohibited from being deleted from a display, and optional information except the required information is permitted to be deleted from the display.

According to another aspect of the present disclosure, there is provided an information processing system including a customizing section that receives a customization instruction of an administrator and customizes an executing screen of processing, a processing executing section that executes the processing in response to reception of an execution start instruction, and a display section that displays the customized executing screen during the execution of the processing, in which the customizing section prohibits required information including information on a remaining amount of consumables from being deleted from a display, and permits optional information except the required information to be deleted from the display.

According to yet another aspect of the present disclosure, there is provided a non-transitory computer-readable storage medium storing a control program, the control program causing a computer to function as a customizing section that receives a customization instruction of an administrator and customizes an executing screen of processing, a processing executing section that executes the processing in response to reception of an execution start instruction, and a display section that displays the customized executing screen during the execution of the processing, in which the customizing section prohibits required information including information on a remaining amount of consumables from being deleted from a display, and permits optional information except the required information to be deleted from the display.

BRIEF DESCRIPTION OF THE DRAWINGS

FIG. 3 is a diagram showing an example of a screen for setting customized contents.

FIG. 6 is a diagram illustrating management of contents by presence or absence of confirmation.

FIG. 8 is a diagram showing an example of a display setting screen for optional information and required information.

FIG. 9 is a flowchart of display processing before and after an error occurs.

DESCRIPTION OF EXEMPLARY EMBODIMENTS

Here, embodiments of the present disclosure will be described in the following order.
1. Configuration of Information Processing System
2. Customization of Printing Screen
3. Display of Customized Printing Screen
4. Presence or Absence of Confirmation of Customized Printing Screen by User
5. Required Information and Optional Information
6. Display After Error Resolution
7. Other Embodiments

1. Configuration of Information Processing System

Figure 1:
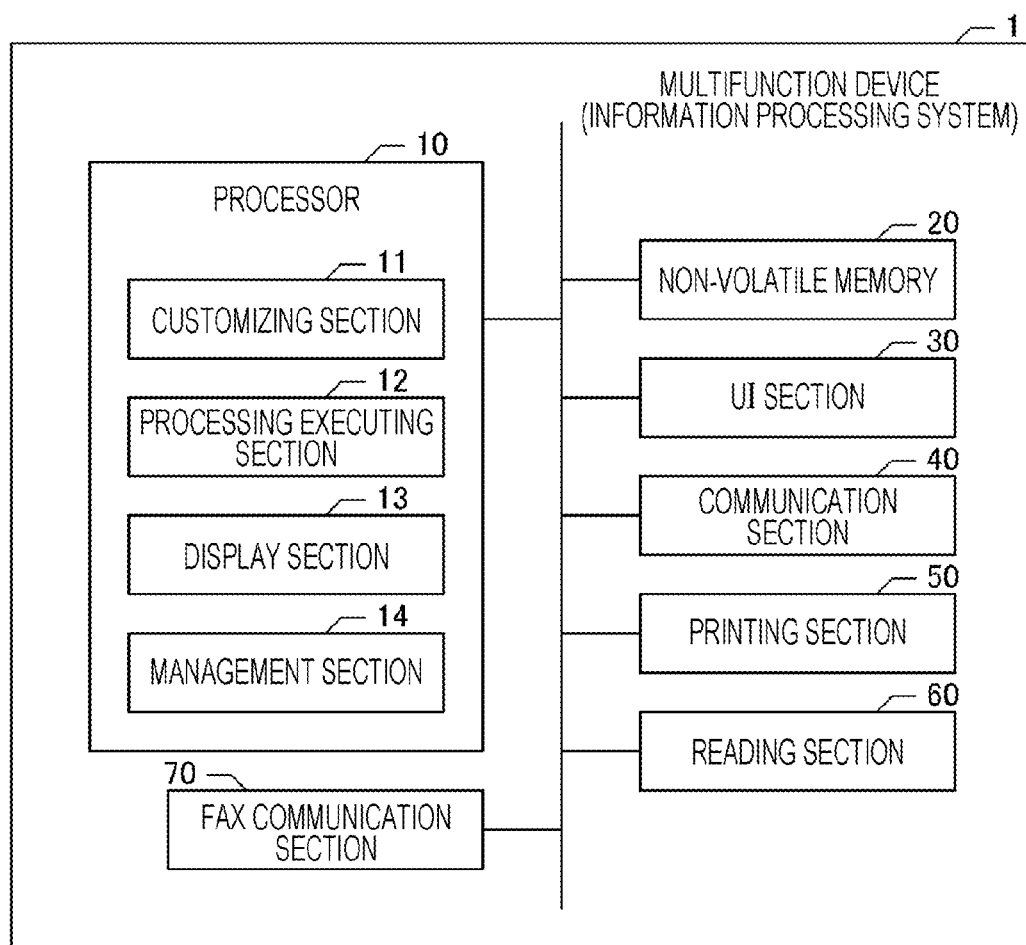
FIG. 1 is a block diagram of a multifunction device.

FIG. 1 is a block diagram showing a configuration of a multifunction device 1 as an information processing system according to an embodiment of the present disclosure. The multifunction device 1 includes a processor 10, a non-volatile memory 20, a user interface (UI) section 30, a communication section 40, a printing section 50, a reading section 60, and a FAX communication section 70. The processor 10 includes a CPU, ROM, RAM, and the like (not shown), and can execute various programs recorded in the non-volatile memory 20 to control each section of the multifunction device 1. The processor 10 may be made of a single chip or constituted by a plurality of chips. Further, for example, the ASIC may be employed instead of the CPU, or the CPU and the ASIC may cooperate with each other.

The UI section 30 includes a touch panel display. The touch panel display includes a display panel that displays various information based on the control of the processor 10 and a touch detection panel that is superimposed on the display panel, and detects a touch operation by a human finger or the like. The touch panel display outputs information indicating the touch operation to the processor 10. The processor 10 acquires the touch operation based on the information. Unless otherwise specified, the information in the present application may be regarded as the same information even if the representation format is different, as long as the same content is conveyed. That is, information may be regarded as the same even if there is a difference in the presence or absence of line breaks or a difference in typeface.

The communication section 40 includes various communication interfaces for communicating with other devices by wire or wirelessly. Further, the communication section 40 includes an interface for communicating with various removable memories mounted on the multifunction device 1. In the present embodiment, the communication section 40 includes an NFC communication section. The NFC communication section has a function of communicating with a NFC tag when the NFC tag is approached within a predetermined distance and acquiring data recorded on the recording medium of the NFC tag.

In the present embodiment, the printing section 50 includes actuators, sensors, drive circuits, mechanical parts, and the like for printing on various print media by various printing methods such as an ink jet method and an electrophotographic method. The reading section 60 includes a device for reading a document placed on a platen glass or a document set on an ADF document tray, for example, a well-known color image sensor or a light source, an actuator for transporting the document, and a drive circuit, a sensor, mechanical parts, and the like.

The FAX communication section 70 is a modem for performing FAX communication of image data indicating a document via a public switched telephone network or the like, a circuit for detecting or generating a control signal for transmitting and receiving the image data, a circuit for encoding transmission data and decoding reception data, and the like.

The multifunction device 1 includes a timekeeping circuit (not shown), and the processor 10 can acquire the current date and time from the timekeeping circuit.

In the present embodiment, it is assumed that the multifunction device 1 is a device that is installed in an office or the like and shared by a plurality of users. A user of the multifunction device 1 carries an ID card and the user's identification number is recorded on the recording medium of the ID card. When the user goes to the multifunction device 1 and uses the multifunction device 1, the multifunction device 1 acquires the identification number by the NFC communication section when the ID card is held over the NFC communication section, and determines whether or not the user is registered in an authentication information table. When the user is already registered in the authentication information table, the user can log in to the multifunction device 1, and by logging in to the multifunction device 1, can use various functions of the multifunction device 1. The multifunction device 1 has a plurality of functions such as a copy function, a print function, a scanning function, and a fax function. Further, the multifunction device 1 can display any content during printing by customization to be described later by the administrator.

The processor 10 can execute a control program (not shown) recorded in the non-volatile memory 20. When the control program is executed, the processor 10 functions as a customizing section 11, a processing executing section 12, a display section 13, and a management section 14.

The customizing section 11 is a function for receiving a customization instruction of an administrator and customizing an executing screen of processing. A process in which the administrator makes settings for displaying any content during the execution of processing in the multifunction device 1 is called a customizing process. In the present embodiment, an example of customizing a printing screen as the processing executing screen will be described. The printing screen is a screen displayed between the start of printing in response to reception of a printing start instruction from a user and the end of the print job corresponding to the instruction. Of course, it may be possible to customize the login screen, the scanning screen, and the FAX communication screen.

The processing executing section 12 is a function of executing processing in response to reception of an execution instruction, and in the present embodiment, is a function of performing printing in response to reception of a printing start instruction. For example, a user transmits a file to be printed from a PC or the like to the multifunction device 1, and the user who logs in to the multifunction device 1 gives a printing start instruction of the file stored in the multifunction device 1 by operating the UI section 30. Further, it may be assumed that the file received by FAX and stored in the multifunction device 1 and the file acquired from another cloud server are printed. In addition, printing in the copy function may be assumed. Upon receiving the instruction to start printing, the processor 10 causes the printing section 50 to execute printing based on the data to be printed. A process in which the processor 10 performs printing by the function of the processing executing section 12 is called a printing process.

The display section 13 is a function of displaying a customized printing screen during printing. The display section 13 also has a function of displaying an uncustomized printing screen during printing. A process in which the processor 10 performs display on the UI section 30 by the function of the display section 13 is called a displaying process.

2. Customization of Printing Screen

Figure 2:
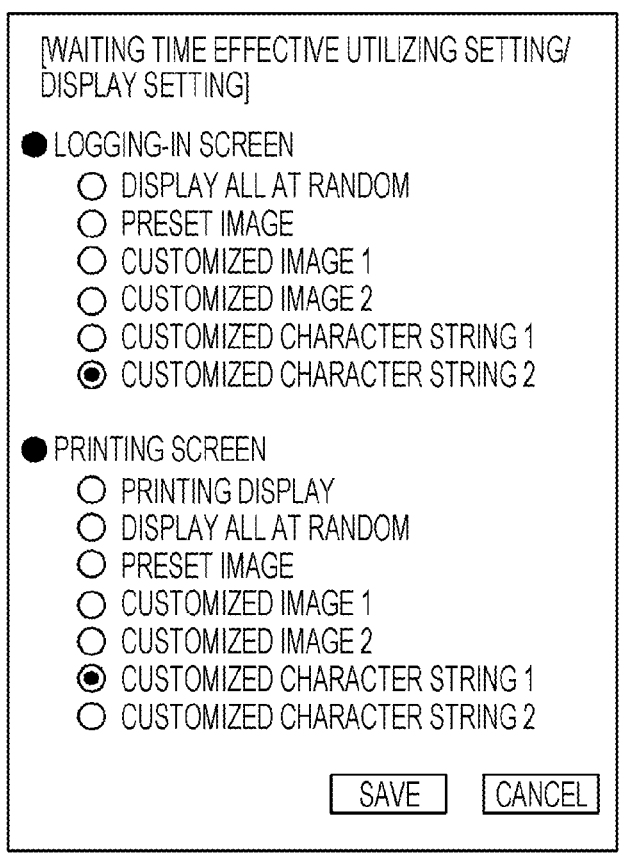
FIG. 2 is a diagram showing an example of a screen for selecting a display mode during printing.

FIGS. 2 and 3 are diagrams showing an example of a screen used in the customizing process. FIG. 2 is a screen for selecting a display mode during printing. A display mode at the time of login can also be selected on the screen of FIG. 2. In the present embodiment, as the display mode during printing, one of "PRINTING DISPLAY", "DISPLAY ALL AT RANDOM", "PRESET IMAGE", "CUSTOMIZED IMAGE 1", "CUSTOMIZED IMAGE 2", and "CUSTOMIZED CHARACTER STRING 1", and "CUSTOMIZED CHARACTER STRING 2" can be selected. When "PRINTING DISPLAY" is selected, the processor 10 displays printing default contents in an area p1 during printing. The area p1 is a predetermined area on the screen of the touch panel display of the UI section 30 (see FIGS. 4 and 5).

Figure 4:
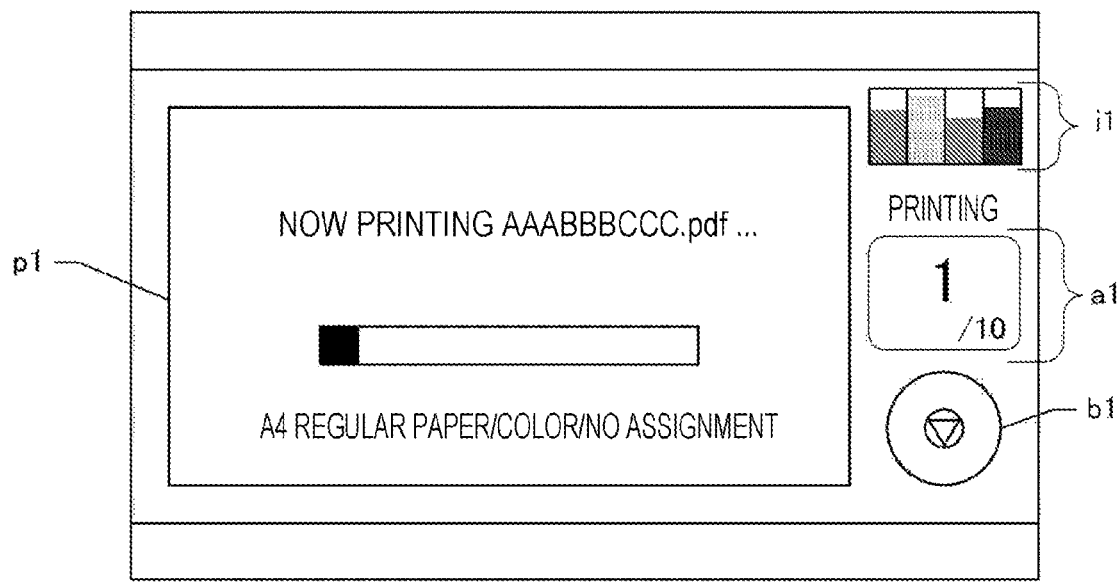
FIG. 4 is a diagram showing an example of a default printing screen.

FIG. 4 is a diagram showing an example of a printing screen (also referred to as a default printing screen) when "printing display" is selected. On the default printing screen, various information indicating the print job being executed is displayed in the area p11. For example, as shown in FIG. 4, a file name being printed, a progress bar indicating the progress status of a print job, other print parameters, and the like may be included. Further, outside the area p1, an icon i1 indicating the remaining amount of ink, a number of pages a1 indicating the printing progress status, a button b1, and the like are displayed. The button b1 is an object for receiving an instruction to stop printing. The default printing screen is an uncustomized printing screen.

The "PRESET IMAGE" (see FIG. 2) is an image prepared by a vendor of the multifunction device 1. In the present embodiment, four still images that introduce and propose, for example, convenient usage of the multifunction device 1 are prepared in advance as preset images. The preset images may be updated when the firmware is updated. When the "PRESET IMAGE" is selected by the administrator on the screen of FIG. 2, the processor 10 performs displaying by switching the preset images in order or randomly in the area p11 of the printing screen during printing. The four preset images may be switched for each print job, or may be switched every time a certain time interval elapses during printing. The printing image including the preset images in the area p11 is a kind of printing screen that is not customized.

"CUSTOMIZED IMAGE 1" and "CUSTOMIZED IMAGE 2" are any image files selected by the administrator, and "CUSTOMIZED CHARACTER STRING 1" and "CUSTOMIZED CHARACTER STRING 2" are any character strings set by the administrator. FIG. 3 is an example of a screen for setting content associated with each of the four types of items in FIG. 2. The screen shown in FIG. 3 allows the administrator to set an image file associated with the customized image 1 or 2. As the image file format, for example, JPEG, PNG, or the like may be assumed. Further, from the same screen, the administrator can set a character string to be displayed as the customized character string 1 or 2. The "CUSTOMIZED IMAGE 1", "CUSTOMIZED IMAGE 2", "CUSTOMIZED CHARACTER STRING 1", and "CUSTOMIZED CHARACTER STRING 2" are content items displayed in the area p1 on the customized printing screen in the present embodiment.

3. Display of Customized Printing Screen

In the present embodiment, by the function of the display section 13, the processor 10 automatically selects and displays at least one of a plurality of printing screens including the customized printing screen depending on a status in the printing process. When "DISPLAY ALL AT RANDOM" in FIG. 2 is selected, the processor 10 randomly selects one from "PRESET IMAGE", "CUSTOMIZED IMAGE 1", "CUSTOMIZED IMAGE 2", "CUSTOMIZED CHARACTER STRING 1", and "CUSTOMIZED CHARACTER STRING 2" during printing, and display the selected one in the area p1. Specifically, the processor 10 selects the content to be displayed in the area p1 according to the estimation of the time required for printing. For example, the processor 10 acquires the number of print pages from the print job data, and when the number of print pages is equal to or less than a threshold value, the processor 10 displays an image randomly selected from the customized image 1, the customized image 2, and four preset images. When the number of print pages is larger than a threshold value, the processor 10 displays a character string randomly selected from all the contents including the customized character strings 1 and 2. It can be assumed that the larger the number of print pages, the longer the time required for printing. The image file is assumed to contain a pattern other than characters, and accordingly, can be assumed to require a shorter time for the user to grasp the content than the "CUSTOMIZED CHARACTER STRING" composed of characters. Therefore, the processor 10 selects whether to display an image file or a customized character string depending on the number of print pages. In "DISPLAY ALL AT RANDOM", the content to be displayed in the area p11 may be switched every time a certain period of time elapses. In that case, the processor 10 selects the content to be displayed next according to the estimated remaining time until the end of printing.

In addition to the number of pages, the time required for printing may be estimated depending on the size of the file to be printed, the number of characters contained in the file to be printed, the type of print file such as whether it is a document or a photo, the size of the print medium (A4, A3, or the like), and the like. Further, in the customizing process, the administrator may be able to input the reference time required for analyzing content in association with the content. Further, the reference time may be calculated by analyzing the content, such as calculating the reference time from the number of characters included in the content. In these cases, the content of which reference time is less than the estimated time required for printing may be selected and displayed.

When the content to be displayed is selected depending on the status in the printing process, the processor 10 may select the content to be displayed, for example, according to the type of print data and printing conditions (parameters) used for printing, in addition to the printing time required as described above. For example, when a user who has logged in to the multifunction device 1 repeatedly prints under the same printing conditions, a preset image for introducing printing conditions that the user has never used may be selected. Further, the content to be displayed may be selected according to a printing execution time slot. For example, the processor 10 may preferentially select content of the scheduled leaving guidance in the afternoon time zone of the day scheduled to leave work on time. In addition, the processor 10 may preferentially select content that encourages stretching for refreshment when printing is executed during the lunch break time zone or the dinner break time zone. In order to select the content to be displayed depending on the status in the printing process, the customizing process may be configured such that the administrator inputs the date and time or time zone in which the content is preferentially displayed for each content and the printing conditions in association with each other. As described above, in the present embodiment, since the content selected from the plurality of contents including the customized image, the customized character string, and the preset image is displayed during printing, the waiting time until the end of printing can be useful to the user.

4. Presence or Absence of Confirmation of Customized Printing Screen by User The management section 14 is a function for managing whether the user confirms or does not confirm the customized printing screen. A process of managing whether or not the processor 10 has made the confirmation by the function of the management section 14 is called a management process. In the present embodiment, when the processor 10 performs an operation indicating that the user has made the confirmation by the function of the management section 14, an attribute is changed to indicate a screen confirmed by the user in response to the operation. The attribute is information indicating whether or not the user has confirmed the content.

Figure 5:
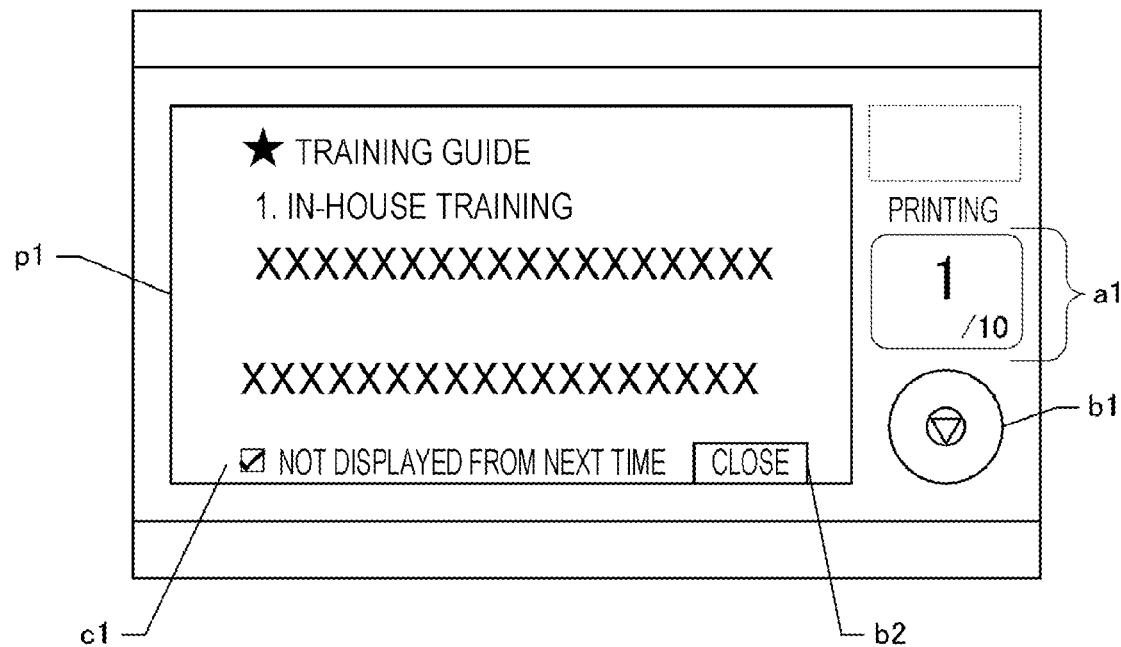
FIG. 5 is a diagram showing an example of a customized printing screen.

FIG. 5 shows an example of the customized printing screen. The processor 10 displays the content selected by the administrator in the area p11. In the example of FIG. 5, the content of the customized character string 2 is displayed. Further, the area p11 includes a check box c1 and a close button b2 for the user to select "NOT DISPLAYED FROM NEXT TIME". The close button b2 is a button for ending the display of the content of the area p1. When the close button b2 is touched, the processor 10 displays a default printing screen when printing is still being performed (see FIG. 4). When the touch operation on the check box c1 is detected, the processor 10 considers that the operation indicating that the user has confirmed the content has been performed, and changes the attribute to indicate that the content has been confirmed.

FIG. 6 is a diagram showing that attributes indicating presence or absence of confirmation are managed for each content and each user. The table shown in FIG. 6 is recorded in the non-volatile memory 20. For example, when a user A logs in and starts printing, and the content of the customized character string 2 is displayed in the area p11 of the printing screen, the user A touches the check box c1 of "NOT DISPLAYED FROM NEXT TIME", the processor 10 set the attribute of the customized character string 2 as "confirmed" by the user A by the function of the management section 14. The initial value of the attribute is "unconfirmed". When the administrator selects a new image file as the customized image on the screen of FIG. 3 or updates the content in the customized character string, the processor 10 initializes the attributes of the customized images and the customized character strings to "unconfirmed" for all users. As shown in FIG. 6, attributes indicating presence or absence of confirmation are managed for each of the four preset images.

In the displaying process, the processor 10 displays a screen unconfirmed by the user with priority over a screen confirmed by the user, depending on a confirmation status of the user for the customized printing screen. That is, when "DISPLAY ALL AT RANDOM" is selected and there are contents of which attributes have been confirmed and contents of which attributes have not been unconfirmed, the processor 10 displays the latter in the area p11. When "DISPLAY ALL AT RANDOM" is selected and the attributes of all the contents to be randomly displayed have been confirmed for a certain user, the processor 10 displays the default printing screen (see FIG. 4).

In this way, since the contents can be confirmed for each user, and "NOT DISPLAYED FROM NEXT TIME" can be selected, there is no need for the user to perform an operation (the close button b2 in FIG. 5) to end the display of the content whenever the same content is displayed multiple times. In addition, since there may be users who want the customized content to be displayed repeatedly, and users who cannot confirm the content in detail now but want to confirm it at the next opportunity, the same content can be repeatedly displayed for such users.

Figure 7:
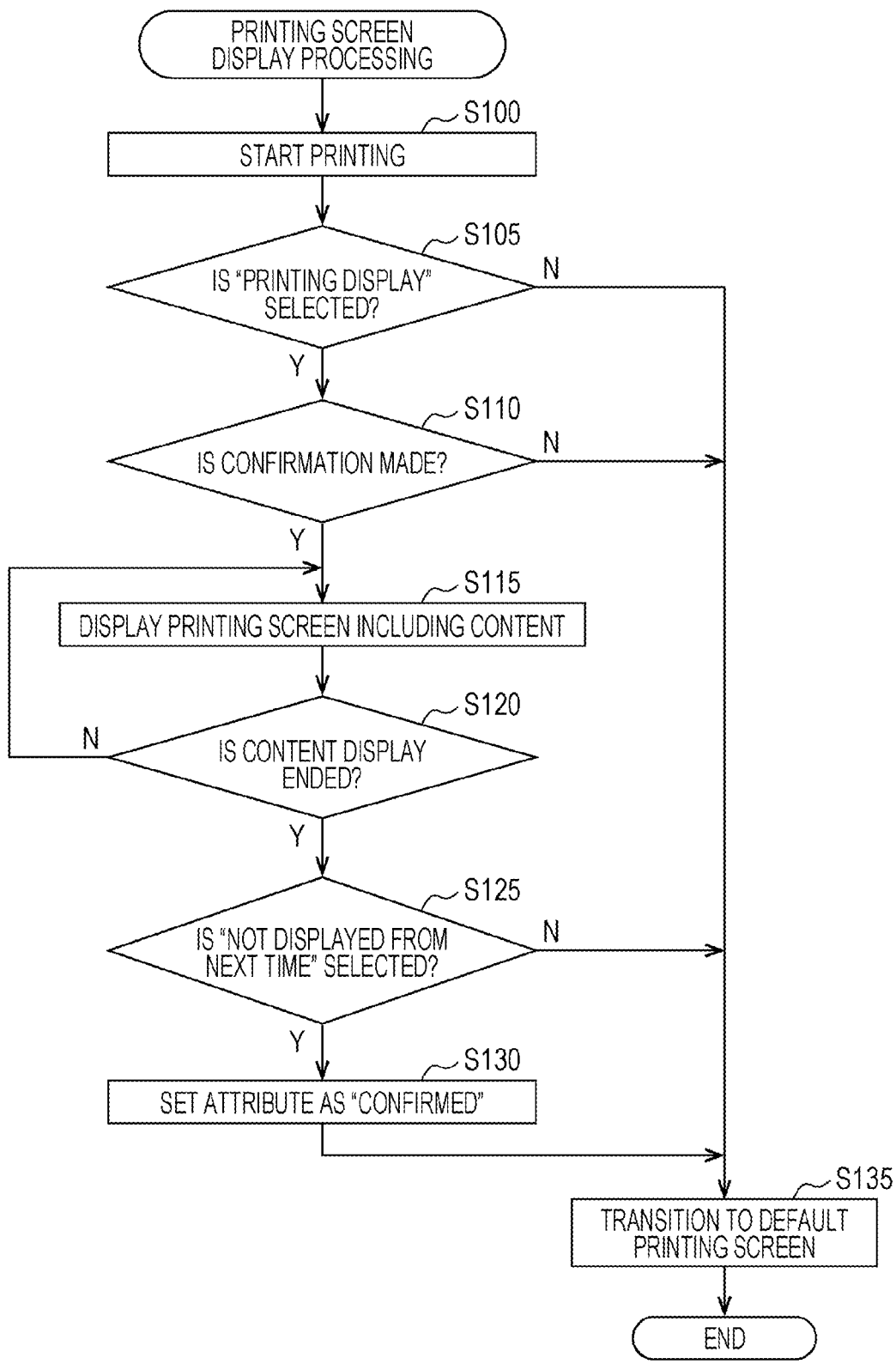
FIG. 7 is a flowchart of printing screen display processing.

FIG. 7 is a flowchart of printing screen display processing. The printing screen display processing is executed in response to reception of the printing start instruction from the user who has logged in to the multifunction device 1. When the printing screen display processing is started, the processor 10 starts printing by the function of the processing executing section 12 (step S100). That is, the processor 10 instructs the printing section 50 to execute printing based on data to be printed. In this way, printing starts.

Subsequently, the processor 10 determines whether or not "PRINTING DISPLAY" is selected by the function of the display section 13 (step S105). That is, in the customizing process, it is determined whether or not the administrator has selected "PRINTING DISPLAY" on the screen shown in FIG. 2. When it is determined in step S105 that "PRINTING DISPLAY" is selected, the processor 10 causes the display to transition to the default printing screen (step S135). That is, the processor 10 displays the default printing screen shown in FIG. 4.

When it is not determined in step S105 that "PRINTING DISPLAY" is selected, the processor 10 determines whether or not the attributes of the content to be displayed have been confirmed (step S110). That is, the processor 10 acquires the display mode selected by the administrator on the screen of FIG. 2 and determines the content to be displayed in the area p1 of the printing screen this time. Then, by referring to the attributes managed for each user and each content (see FIG. 6), it is determined whether or not the logged-in user has confirmed the content to be displayed this time.

When it is determined in step S110 that the confirmation has been made, the processor 10 executes step S135. When it is not determined in step S110 that the confirmation has been made, the processor 10 displays the printing screen including the content by the function of the display section 13 (step S115). That is, as shown in FIG. 5, the processor 10 displays the printing screen containing the content in the area p1.

Subsequently, the processor 10 determines whether or not an event for ending the display has occurred by the function of the display section 13 (step S120). That is, the processor 10 determines whether or not the content has been displayed for a certain period of time before the end of the current print job, or whether or not the user has performed an operation of "closing" the content.

When it is not determined in step S120 that the event for ending the content display has occurred, the processor 10 returns to step S115 and continues to display the printing screen including the content. When it is determined in step S120 that the event for ending the content display has occurred, the processor 10 determines whether or not the user has selected "NOT DISPLAYED FROM NEXT TIME" by the function of the management section 14 (step S125). That is, the processor 10 determines whether or not the user has performed an operation of putting a check mark in "NOT DISPLAYED FROM NEXT TIME" before the content display ends. When "NOT DISPLAYED FROM NEXT TIME" is selected in step S125, the processor 10 executes step S130.

When it is determined in step S125 that "NOT DISPLAYED FROM NEXT TIME" is selected, the processor 10 sets the attribute as "confirmed" by the function of the management section 14 (step S130). That is, the processor 10 sets the attribute of the content displayed in step S115 as "confirmed". After executing step S130, the processor 10 executes step S135.

5. Required Information and Optional Information

In the present embodiment, when the customized printing screen is displayed on the UI section 30, the processor 10 displays required information in a vacant area. In another embodiment, a configuration may be employed in which the required information is displayed on a customized printing screen in a superimposed manner. The required information includes information on the remaining amount of consumables. In the present embodiment, the information on the remaining amount of the recording agent such as ink and toner is assumed as the required information. Information regarding when to replace the print head may be included in the required information. By the function of the customizing section 11, when the customized printing screen is displayed, the processor 10 prohibits the required information including the information on the remaining amount of consumables from being deleted from the display, and permits optional information except the required information to be deleted from the display.

FIG. 8 is an example of a display setting screen for optional information and required information when a customized printing screen is displayed. In the present embodiment, printing progress information is assumed as an example of the optional information. The administrator can select whether or not to display the printing progress status on the screen shown in FIG. 8. That is, it is permitted to delete optional information from the display on the customized printing screen. When non-display is selected for the printing progress status, the number of pages a1 indicating the printing progress status in FIG. 5 is put into non-display. The characters "PRINTING" may continue to be displayed.

Meanwhile, the processor 10 can present the screen such that the administrator can select whether to always display information on the remaining amount of ink, which is required information, or to display it depending on the status. As shown in FIG. 8, for "depending on the status", for example, it may be assumed that the amount of ink of any one color is less than or equal to a predetermined amount. Therefore, in the present embodiment, the administrator cannot select to always put the required information into non-display, but it is not always necessary to display the required information. That is, although it is always prohibited to delete required information from the display, the required information is not prevented from being put into non-display depending on the status. When any of the inks is more than a predetermined amount, the information regarding the remaining amount of ink is not displayed, and when any one color of ink is less than or equal to the predetermined amount, information regarding the remaining amount of ink is displayed in the area surround by the dashed line shown in FIG. 5.

Further, on the screen shown in FIG. 8, by the function of the customizing section 11, the processor 10 presents the display format of the required information so that the administrator can select the display format and accepts that the administrator changes the display format. For example, as options for the display format of the information on the remaining amount of ink, a display format indicating the ink remaining amount by an icon and a display format indicating the ink remaining amount by an icon and a description may be presented. When an icon is selected for displaying, an icon indicating the remaining amount of ink is displayed in the area of the dashed line in FIG. 5. In the present embodiment, the display format can also be selected for the printing progress status, which is optional information. The printing progress status display format is displayed in a selectable manner when "DISPLAY" is selected for the printing progress status.

As described above, according to the present embodiment, the required information can be displayed even on the customized printing screen, and thus the user can be notified of the highly important information that needs to be presented to the user.

6. Display After Error Resolution

When an error (for example, the remaining amount of the print medium becomes 0, the print medium becomes clogged in the transport path, the remaining amount of ink becomes 0, and so on) occurs in a state in which printing is being executed while displaying the customized printing screen, the processor 10 superimposes and displays, on the customized printing screen, an error screen for notifying that an error has occurred and for guiding a method for resolving the error. When the user resolves the error with the guidance on the error screen, the processor 10 detects the error resolution. For example, sensors for detecting the states of each section of the multifunction device 1 such as a sensor that detects the remaining amount of ink and the remaining amount of the print medium are provided, and the processor 10 can detect that the error has been resolved based on the output of the sensors. When the error resolution is detected, the processor 10 resumes printing. At this time, the processor 10 performs displaying by switching to the default printing screen, which is an uncustomized printing screen during printing of the print job in which the error has occurred or printing of a predetermined page after resuming printing. That is, even if the customized printing screen is displayed until the error occurs, when printing is resumed after the error is resolved, the default printing screen is displayed until printing of all pages of the print job in which the error has occurred, or until printing of the predetermined page after resuming printing is completed. The printing screen customized by the occurrence of an error may be switched to the default printing screen.

It is possible to display the customized printing screen even after the error is resolved, but it is assumed that the user wants to know whether printing will be executed without any problem after the error is resolved. The default printing screen has more information regarding the print job being executed than the customized printing screen. Therefore, it is desirable that the processor 10 can present the information that the user wants to know by performing displaying by switching to the default printing screen after resuming printing. When it is selected to put the printing progress status into "non-display" on the screen shown in FIG. 8 when the customized printing screen is displayed as before the error has occurred even after printing is resumed, it is difficult for the user to promptly know whether or not printing is proceeding smoothly after resuming printing. However, according to the present embodiment, after resuming printing after the error is resolved, the default printing screen is displayed, and thus the user can easily confirm that the printing is being in progress without any problem. The predetermined page after resuming printing may be, for example, one or two pages.

The display processing before and after the error occurs will be described with reference to a flowchart of FIG. 9. The processing is started when the administrator has selected to display the customized printing screen and printing is instructed to start. First, the processor 10 displays the customized printing screen until an error occurs (steps S200, S205). When an error occurs during printing (Y determination in step S205), the processor 10 displays an error screen until the error is resolved (steps S210 and S215). When the error is resolved (Y determination in step S215), the processor 10 displays the default printing screen until printing is completed (steps S220 and S225).

S225 in the flowchart of FIG. 9 assumes that printing of the last page of the print job in which the error has occurred ends, and after Y determination in step S225, the processor 10 ends the display of the default printing screen and displays the home screen. Then, from the next print job, the processor 10 displays the customized printing screen again during printing. For example, in a 10-page print job, when an error occurs on the fifth page, the processor 10 displays the customized printing screen for pages 1 to 5 and displays an error screen due to an error, and after the error is resolved, displays default printing screen during printing pages 5 to 10. Then, from the next print job, the processor 10 displays the customized printing screen again.

When step S225 refer to the end of printing for the predetermined page after resuming printing, after Y determination in step S225, the processor 10 stops displaying the default printing screen and displays the customized printing screen during printing of the remaining pages of the print job. For example, in a 10-page print job, when an error occurs on the fifth page, the processor 10 displays the customized printing screen for pages 1 to 5 and displays an error screen due to an error, displays the default printing screen during printing of the predetermined page (for example, the fifth page) after resolving the error, and displays the customized printing screen again after the sixth page.

Furthermore, depending on the severity level of the error, a configuration for switching the time until which the default printing screen is displayed after resuming printing may be employed. Levels 1, 2, and 3 are given in order from the less severe one. Level 1 assumes that, for example, the remaining number of print media is 0, level 2 assumes that, for example, the remaining amount of ink is 0, and level 3 assumes that, for example, the print medium is jammed in the transport path. In the case of level 1, the display of the customized printing screen may be restored immediately after resuming printing. In the case of level 2, after resuming printing, the default printing screen may be displayed for the predetermined page, and the customized printing screen may be restored when printing for the predetermined page is completed. In the case of level 3, after resuming printing, the default printing screen may be displayed until the executing print job is completed.

7. Other Embodiments

The above embodiment is an example for implementing the present disclosure, and various other embodiments can be employed. For example, the present disclosure can be applied to various information processing systems other than multifunction devices. The information processing system may be provided with a customizing section, a processing executing section, and a display section, and may be, for example, a printer or a scanner, a personal computer, a smartphone, or a tablet, or a combination thereof. The device provided with the processing executing section and the display section and the device provided with the customizing section may be different devices. Further, the processing executing section, the display section, and the customizing section may be separate devices. The device including the processing executing section and the device including the display section and the customizing section may be different devices. For example, the customized printing screen may be saved in a server outside the device, and the customized printing screen may be displayed from the server immediately before the customized printing screen is displayed.

Further, the processing executed by the processing executing section may be any processing that is executed by receiving an execution start instruction from the user. For example, it may be login processing, log-off processing, a print, a scan, a FAX transmission, or FAX received data transmission processing, or a file transmission and reception by communication other than FAX. Further, it may be data search processing, duplication processing, or deletion processing.

When an error occurs during execution of processing and then the error is resolved and the processing is resumed, a display may be performed by switching to an uncustomized executing screen until the execution of the processing in which the error has occurred is completed or during a predetermined period after resuming the execution. The predetermined period after resuming the execution may be defined by the length of time. Alternatively, the predetermined period after resuming the execution may be a period during which a predetermined number of steps to be executed after resuming among the plurality of steps constituting the processing are executed.

In the displaying process, when at least one of a plurality of printing screens including the customized printing screen is automatically selected and displayed depending on the status in the printing process (the executing status of processing other than printing may be used), in the above embodiment, the configuration is employed in which one of the content (customized image and customized character string) set by the administrator and the preset image is automatically selected and displayed. As another embodiment, a configuration can be assumed in which at least one of a customized printing screen and an uncustomized printing screen is selected and displayed. For example, a configuration may be employed in which at least one of the customized printing screens including the content set by the administrator, the printing screen including the preset image, and one of the default printing screens are selected and displayed. In addition, although the screen shown in FIG. 2 shows an example in which radio buttons are shown so that one of the radio buttons can be selected and guided, check boxes may be presented in a multi-selectable manner. Then, the printing screen may be configured in a mode automatically selected from those selected among the check boxes. Two or more contents may be displayed at the same time.

The content of customization is not limited to the above-described embodiment. For example, a combination of text, a still image, and a moving image may be displayed. In addition to the display, customization may be performed to generate sound. When a device manufacturer determines that required information is unnecessary, the required information may not be set and all information on the default printing screen may be set as optional information.

The customizing process may include accepting the administrator to change at least one of the display format and the display position of the required information. Required information is information that has to be displayed whenever a specific condition occurs. In the above embodiment, the example has been described in which the display format can be changed, but the display position of the required information may be changed by the administrator. The display position of the required information may be selected by the administrator to be superimposed and displayed on the customized content, or may be selected by the administrator to be displayed in an empty space. In addition, the "status" when displaying required information depending on the status is a status in which a specific condition has occurred.

In the above embodiment, as an example of the management process, a configuration has been employed in which the customized printing screen has been confirmed by the user performing an operation on the check box of "NOT DISPLAYED FROM NEXT TIME", but the following methods may also be employed. For example, the processor measures a display time of the content by using a timekeeping circuit, and manages the cumulative display time for each user and each content. Then, an attribute may be changed to a screen confirmed by the user in response to a cumulative display time of the screen unconfirmed by the user reaching a threshold value or exceeding the threshold value. Further, for example, for the content unconfirmed by a user, the processor measures the continuous display time from the start of display to the end of display by using the timekeeping circuit. Then, an attribute may be changed to the screen confirmed by the user in response to a continuous display time of the screen unconfirmed by the user reaching a threshold value or exceeding the threshold value.

In addition, the customizing process may include presenting the administrator to select whether or not to repeatedly display the customized printing screen. This selection may be possible for each content. When the administrator selects to repeatedly display the customized printing screen, the processor displays the customized printing screen even if the user has confirmed the customized printing screen, and when the administrator selects not to repeatedly display the customized printing screen, the processor does not display the customized printing screen if the user has confirmed the customized printing screen. For example, for content for business alert or content for which many users have not selected "NOT DISPLAYED FROM NEXT TIME" (content that is repeatedly read by many users), the attribute may be set as "unconfirmed" again after a certain period of time and the content may be displayed repeatedly, even if the content is confirmed once. In this way, it is possible to increase the opportunity to provide information that may be useful to the user.

The displaying process may include displaying another printing screen in response to an operation of the user performed during the display of the customized printing screen. For example, a button such as "NEXT" may be displayed in the area p1 of the customized print screen shown in FIG. 5. When an operation is performed on the "NEXT" button, the processor displays other customized printing screens and the default printing screen. The screen displayed with "NEXT" is preferably an unconfirmed screen. In this way, the user may be able to manually switch the printing screen.

Furthermore, the present disclosure is not limited to displaying the default printing screen after the error is resolved, and the amount of information regarding the print job being executed after the error resolution may be switched to a printing screen with more customization than the customized printing screen has been displayed up to the occurrence of the error. This includes performing displaying by forcibly switching the customized printing screen, in which the optional information is in non-display, to display the optional information after the error is resolved.

Further, as the present disclosure, a program or method executed by a computer can be applied. Further, the system, program, and method as described above may be implemented as a single device or may be implemented by using parts provided in a plurality of devices, and include various aspects. In addition, some are software and some are hardware, which can be changed as appropriate. Further, the disclosure is also established as a recording medium for a program that controls a system. Of course, the recording medium for the program may be a magnetic recording medium or a semiconductor memory, and any recording medium to be developed in the future can be considered in exactly the same way.

What is claimed is:

1. A printing method comprising:
    receiving a customization instruction of an administrator and customizing a printing screen;
    performing printing in response to reception of a printing start instruction; and
    displaying a customized printing screen in which the printing screen has been customized based on the customization instruction, the customized printing screen being displayed after starting the printing in response to the reception of the printing start instruction before ending a print job related to the printing start instruction, wherein
    in the customizing of the printing screen, required information including information on a remaining amount of consumables is prohibited from being deleted from a display, and optional information except the required information is permitted to be deleted from the display.

2. The printing method according to claim 1, wherein
    in the customizing of the printing screen, accepting of changing, by the administrator, at least one of a display position and a display format of the required information is performed.

3. The printing method according to claim 1, wherein
    in the customizing of the printing screen, a selection is made by the administrator as to whether to always display the required information, or to display the required information depending on a status.

4. An information processing system comprising:
    a customizing section that receives a customization instruction of an administrator and customizes an executing screen of processing;
    a processing executing section that executes the processing in response to reception of an execution start instruction; and
    a display section that displays a customized executing screen in which the executing screen has been customized based on the customization instruction, the display section displaying the customized executing screen after starting of execution of the processing in response to the reception of the execution start instruction before ending of a job related to the execution start instruction, wherein
    the customizing section prohibits required information including information on a remaining amount of consumables from being deleted from a display, and permits optional information except the required information to be deleted from the display.

5. A non-transitory computer-readable storage medium storing a control program, the control program causing a computer to function as:
    a customizing section that receives a customization instruction of an administrator and customizes an executing screen of processing;
    a processing executing section that executes the processing in response to reception of an execution start instruction; and
    a display section that displays a customized executing screen in which the executing screen has been customized based on the customization instruction, the display section displaying the customized executing screen after starting of execution of the processing in response to the reception of the execution start instruction before ending of a job related to the execution start instruction, wherein
    the customizing section prohibits required information including information on a remaining amount of consumables from being deleted from a display, and permits optional information except the required information to be deleted from the display.

* * * * *